July 27, 1937.  R. C. SWINK  2,088,121
ROTARY ENGINE
Filed Oct. 1, 1932  4 Sheets—Sheet 1
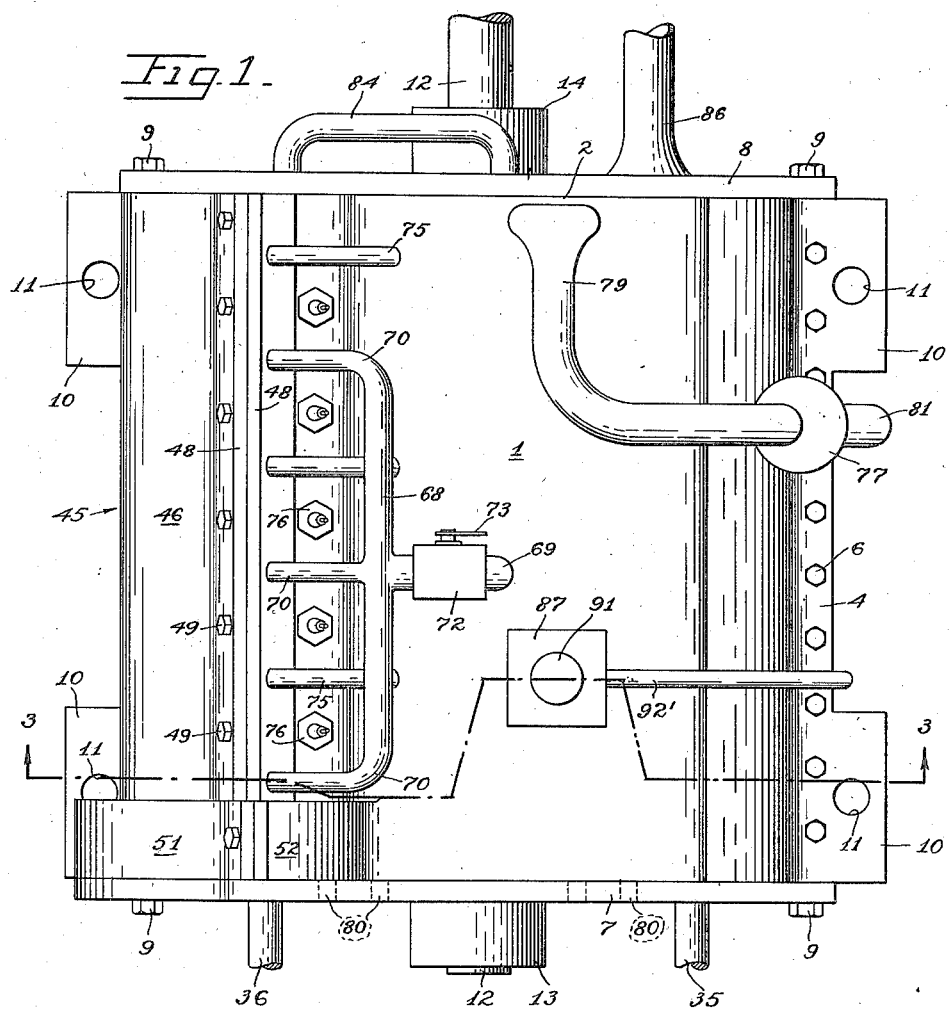
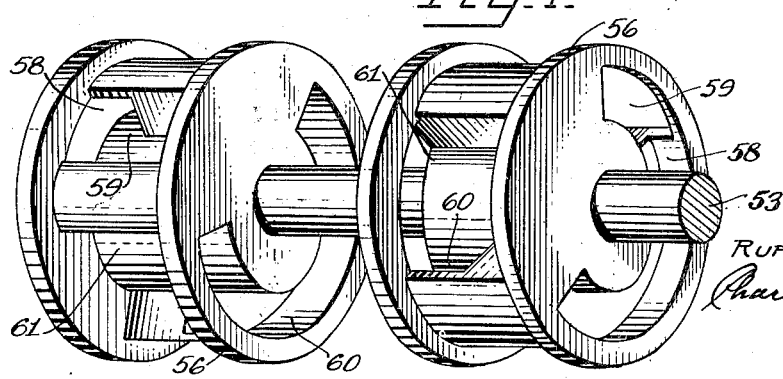
INVENTOR.
RUFUS CLYDE SWINK
Charles O. Bruce
ATTORNEY July 27, 1937.  R. C. SWINK  2,088,121
ROTARY ENGINE
Filed Oct. 1, 1932  4 Sheets-Sheet 2

INVENTOR.
RUFUS CLYDE SWINK
BY Charles O. Bruce
ATTORNEY

July 27, 1937.  R. C. SWINK  2,088,121

ROTARY ENGINE

Filed Oct. 1, 1932   4 Sheets-Sheet 3

INVENTOR.
RUFUS CLYDE SWINK
BY Charles O. Bruce
ATTORNEY

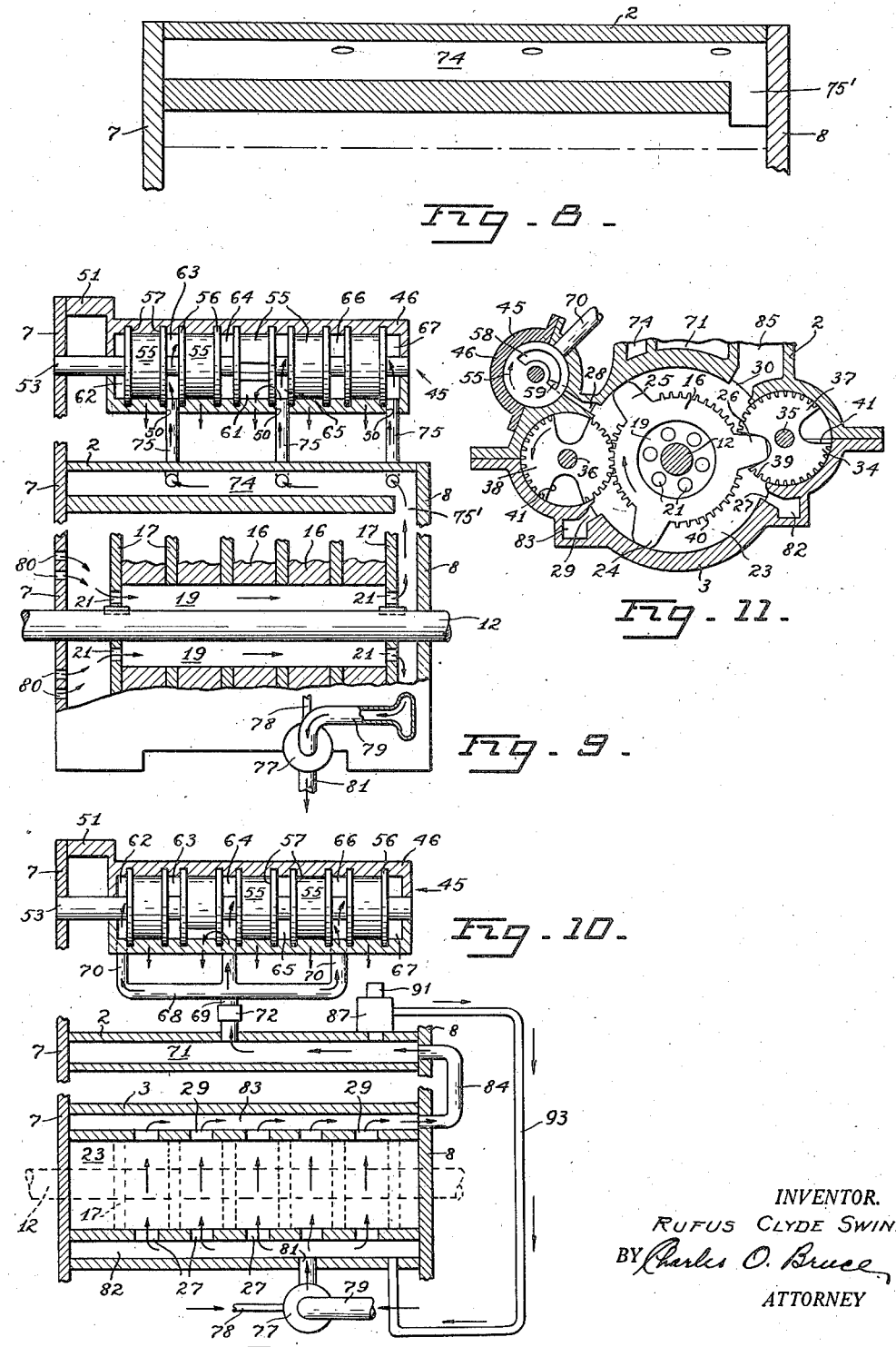

Patented July 27, 1937

2,088,121

UNITED STATES PATENT OFFICE 2,088,121

ROTARY ENGINE

Rufus Clyde Swink, Berkeley, Calif.

Application October 1, 1932, Serial No. 635,711

1 Claim. (Cl. 123—13)

My invention relates to a rotary engine, and particularly to a rotary engine of the internal combustion type.

An object of my invention is the provision of a compact and durable rotary engine of relative light weight, having a large capacity, and which may be readily and economically manufactured.

Another object of my invention is the provision of a device, of the character described, in which a plurality of impulses is given to the rotor during every revolution thereof.

A further object of my invention is to provide a rotary engine which is internally air cooled.

An additional object of my invention is the provision of a device, of the class described, wherein all moving parts are rotary.

A further object of my invention is the provision of a device, of the class described, employing a valve through which air for cooling and motive fluid are introduced into alternate compartments in the internal chamber thereof.

Additional objects and advantages of my invention will be apparent from a perusal of the following description forming part of this specification, but I do not limit myself to the embodiment of my invention herein described, as various forms may be adopted within the scope of the claim.

Referring to the drawings:

Figure 1 is a plan view of the rotary engine embodying my invention.

Figure 7 is a perspective view of a portion of the rotary valve.

Figure 8 is a vertical sectional view of the air chamber of my device, looking in the direction of the arrows 8—8 of Figure 3.

Figure 9 is a schematic diagram illustrating the path of travel of the air through my device.

Figure 10 is a schematic diagram illustrating the path of travel of the motive fluid through my device.

Figure 11 is a fragmentary vertical sectional view similar to Figure 3 but showing the relative position of the parts at the time of the introduction of motive fluid into the combustion chamber.

Figure 2:
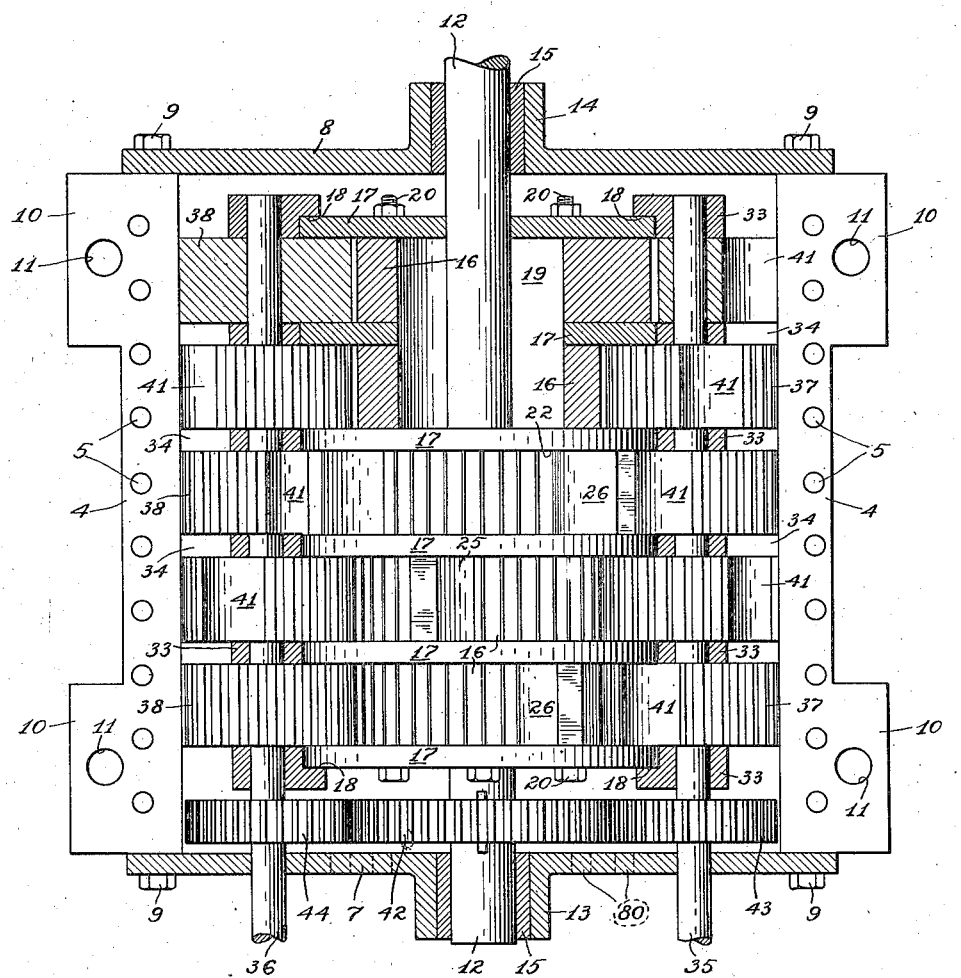
Figure 2 is a horizontal sectional view of the rotor and abutment mechanism. Part of structure is shown in elevation to disclose clearly the construction.

In terms of broad inclusion, my invention comprises a casing having a central bore within which a rotor is mounted for rotation. The rotor forms an annular chamber with the casing and carries a plurality of pistons which project into and divide the chamber into compartments. Suitable ports communicating with the chamber are provided for the intake and outlet of fluid or exhaust, while a rotary abutment adapted to cooperate with the rotor to seal the space between the inlet and outlet ports is mounted in the casing and is of such construction as to intermittently register with the pistons. A rotary valve is also provided which is adapted to deliver alternately air and motive fluid into said compartments.

With reference to the preferred embodiment of the device of my invention, I have chosen for the purposes of illustration a five channeled or unit rotary combustion engine shown by the drawings. As illustrated, the invention comprises a hollow casing 1 formed of the two matching sides 2 and 3, each having out-turned flanges 4, with apertures 5 therethrough to accommodate the bolts 6 for rigidly holding the sides together. Oppositely disposed end plates 7 and 8, each firmly secured to sides 2 and 3 by means of the bolts or screws 9, serve to enclose the ends of the casing and provide a rigid structure. Sides 2 and 3 are provided with ears 10 having apertures 11 therethrough to provide a supporting bracket for securing the casing to any suitable or convenient portion of an automobile, airplane or other structure.

A rotor shaft 12 extends transversely through the casing and is journaled in the bearing 13 of end plate 7 and the bearing 14 of end plate 8; the bearings being lined with bushings 15. Keyed or otherwise fastened to shaft 12 is a hollow drum or rotor comprising a plurality of annular rings 16 separated by circular partition walls 17 whose peripheries are adapted to run in the internal grooves 18 of the casing. The two endmost of the partition walls 17 are keyed to shaft 12 and form the end walls of a cylindrical chamber 19, the sides of which are formed by the internal surfaces of the rings 16 and the inner edges of the remaining partition walls 17. These rings and partition walls are rigidly locked together by means of the bolts 20, to form a unitary structure or rotor keyed to and rotatable with shaft 12. Apertures 21 are provided in the partition walls 17, which form the end walls of chamber 19, to permit the passage of air therethrough. It is apparent that the rotor may be cast as a unit. However, the construction I have described is preferred, since it facilitates construction as well as replacement and repair.

The rings 16 and partition walls 17 are so constructed as to form with the internal face of the casing the annular chambers 22, each of which is divided into a plurality of compartments 23, by the pistons 24, 25 and 26. These pistons are radially disposed with reference to the axis of the rotor and extend outwardly from rings 16 with their outer faces flush with the internal face of sides 2 and 3. I prefer that the pistons 24, 25 and 26 in each of the chambers 22 be staggered with relation to the corresponding pistons in the adjacent chambers and that such lag or stagger in a five unit construction be substantially 24° as measured from the axis of the rotor, thus providing for a suitable overlapping of the power impulses to produce smoothness of operation.

It is to be observed that the masses of the pistons 24, 25 and 26 are so disposed with relation to the mass distribution of the rotor that the whole is kinetically as well as statically balanced, and as a result any radial force produced on the shaft by reason of the rotation of the rotor will be neutralized by an equal and opposite force, thus reducing vibration during operation of the engine to a minimum.

Figure 3:
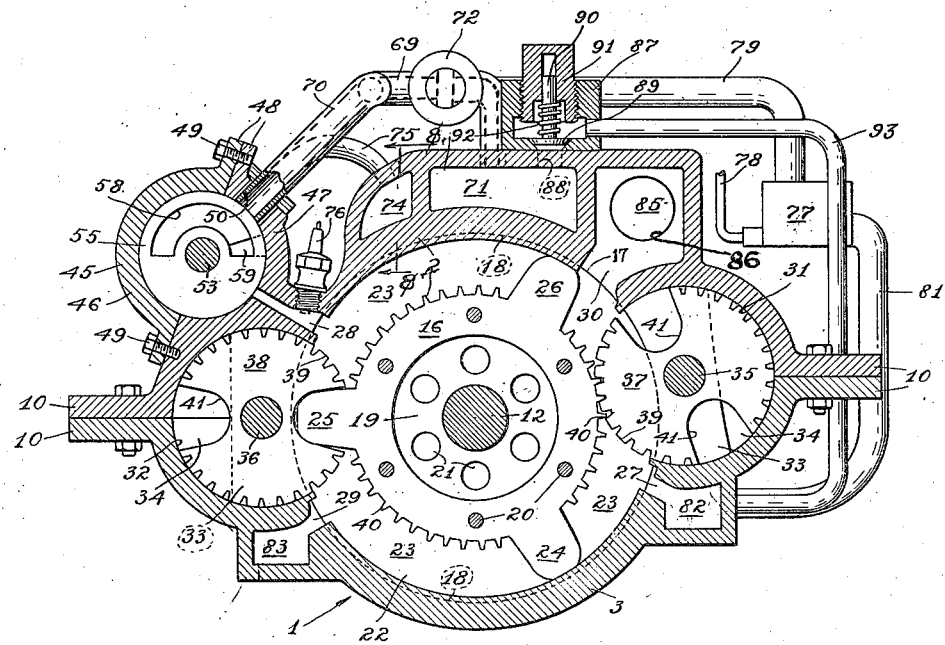
Figure 3 is a vertical sectional view looking in the direction indicated by the arrows 3—3 of Figure 1.

The casing, opposite each of the chambers 22, is provided with inlet ports 27 and 28 and outlet ports 29 and 30. As shown in Figure 3, these ports are arranged in pairs, each pair comprising an inlet port and an outlet port disposed on opposite sides of the juncture of the sides 2 and 3. It will be observed that the distance between the inlet port 27 and outlet port 29 is greater than the distance between the outer faces of adjacent pistons, thereby providing against direct communication between such ports and the flow back of motive fluid. The sides 2 and 3 adjacent their junctures and between each pair of ports are so shaped as to provide cylindrical recesses 31 and 32 which open into the chamber 22 opposite thereto. I prefer to separate the recesses 31 and 32 from the corresponding recesses opening into the adjacent chambers 22 by stationary abutments 33 forming a part of the casing. One edge of these stationary abutments is flush with the peripheral edge of the partition walls 17, while the opposite edge is cut away to form a passage 34 between the corresponding rotary abutments.

Extending transversely through the recesses 31 and 32 are abutment shafts 35 and 36, each journaled for rotation in suitable bearings arranged in the stationary abutments 33. Both of these shafts extend through end plate 7, thereby providing means external of the casing for the mounting of a generator and suitable ignition timing mechanism (not shown). Keyed or otherwise fastened to such abutment shafts and snugly fitting the recesses 31 and 32 are the rotary abutments 37 and 38. These rotary abutments are of substantially the same width as that of the chamber 22 opposite thereto and extend to the bottom of such chamber, thus forming a seal between each pair of inlet and outlet ports. The outer faces of the rotary abutments 37 and 38 are provided with teeth 39 adapted to mesh with the teeth 40 of the ring 16 forming the bottom of chamber 22, thereby offering effective resistance to leakage of fluid therebetween. I prefer that the channel between the teeth of the rotary abutments shall be relatively narrow, in order to reduce to a minimum the amount of fluid transferred thereby from the chambers 22 to the passages 34.

The faces of the rotary abutments 37 and 38 are cut away, as shown in Figure 3, to form the oppositely disposed wells 41 within which the pistons 24, 25 and 26 are temporarily accommodated in their movement therepast. These wells are preferably so disposed relative to the mass distribution of each rotary abutment that the same are kinetically as well as statically balanced, thus minimizing vibration during operation. I further prefer to relate the number of these wells in each abutment to the number of cooperating pistons on the rotor so that each of these pistons shall engage with each well during operation of the engine. My purpose in this is to effect minimum and uniform wear of the cooperating surfaces and thereby secure a longer useful life for the engine as a whole. The wells 41 in the rotary abutments opposite each of chambers 22 are staggered with relation to the corresponding wells in adjacent abutments, in order to properly register with the pistons. Splined or otherwise fastened to the rotor shaft 12, between the rotor and end plate 7, is the gear 42 which is adapted to mesh with the gears 43 and 44 on the abutment shafts 35 and 36, respectively. The relative diameters of these gears are such that gears 43 and 44 make three revolutions to every two of the gear 42, thus causing the pistons 24, 25 and 26 to intermittently register in the wells 41 of the rotary abutments.

An annular housing 45 extends along one side of the casing adjacent inlet ports 28 and is formed of two matching halves or parts 46 and 47, each having out-turned flanges 48 adapted to receive the bolts or screws 49 for securing the same together. As shown in Figures 3 and 11, the half or part 47 is formed integral with the casing and is provided with a plurality of apertures 50 adapted to receive the ends of pipes 70 and 75. The other half or part 46 is provided at one end with a semi-circular flange or cup 51 adapted to match the flared portion 52 of the casing. A valve shaft 53 extends longitudinally through housing 45 and is journaled for rotation in suitable bearings 52' and 53' arranged between the two halves forming the ends thereof. Splined or otherwise fastened to shaft 53 and within the flared portion 52 and cup 51 is the gear 54 adapted to mesh with the gear 44 of the abutment shaft 36. These gears are of the same size, whereby their shafts will rotate in unison.

Figure 5:
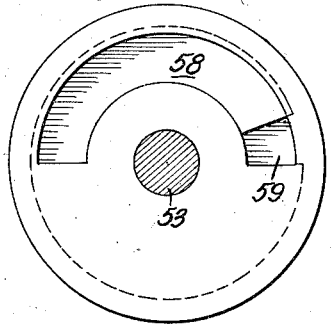
Figure 5 is a side elevation of the valve, looking in the direction of the arrows 5—5 of Figure 4.
Figure 6:
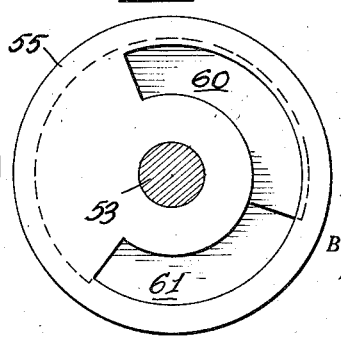
Figure 6 is a side elevation of the same valve, but looking in the direction of the arrows 6—6 of Figure 4.
Figure 4:
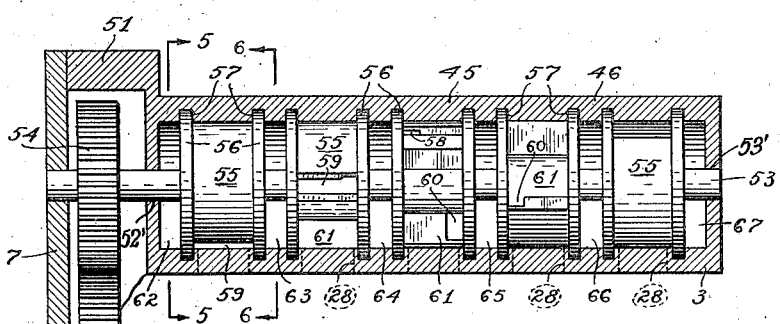
Figure 4 is a horizontal sectional view of the valve structure and housing of my device. Part of the structure is shown in elevation to clearly illustrate the construction.

A rotary valve 55, rotatable with valve shaft 53, is provided in housing 45 opposite each of the inlet ports 28. These valves are cylindrical in shape, and, as shown in Figure 4, are provided, adjacent their opposite ends, with out-turned flanges 56 adapted to run in the annular channels 57 of the housing. A portion of the end of each valve is cut away, as shown in Figure 5, to provide an arcuate shaped recess 58, one end of which connects with the valve well 59 which opens outwardly through the sides or faces of the valve flush with the inner sides of flanges 56. The opposite end of each of the valves 55 is cut away, as shown in Figure 6, to provide an arcuate shaped recess 60, one end of which connects with the valve well 61. This valve well likewise opens outwardly through the sides or faces of the valve 55 between the flanges 56, but at a point adjacent to the valve well 59. The recesses 58 and 60 are provided to supplement the volume of the valve chambers which receive the fuel mixture or air, as the case may be, and transfer them to the proper passages as the valve rotates. Due to the necessity of providing two recesses in each valve 55, the cross-sectional area thereof will obvious be restricted; therefore, I provide the wells 59 and 61, communicating with the recesses 58 and 60, respectively, and extending transversely entirely across the face of the valve periphery so that additional volume is added to each valve chamber and the largest possible opening is provided which, when registered with the inlet or outlet ports, will offer the least obstruction to the flow of fuel mixture or air therethrough. It is apparent also that there is no communication between the wells 59 and 61 or between the arcuately shaped recesses 58 and 60. The wells in each valve, however, are adapted to alternately register with the port 28 in their movement therepast. Furthermore, the wells in each of the valves are staggered with relation to the corresponding wells in the adjacent valves, in order to register with ports 28 in timed relation to the passage past such ports of the pistons in the chamber 22 opposite thereto.

Valves 55, with like recessed ends facing each other, are arranged in housing 45 so as to provide the annular chambers 62, 63, 64, 65, 66 and 67. It is to be noted that when the valves are so positioned, the arcuate shaped recesses 58 open into alternate chambers 62, 64 and 66, while the arcuate shaped recesses 60 open into the intermediate chambers 63, 65 and 67.

A manifold 68, having an inlet pipe 69 and outlet pipes 70, provides a passage for the transfer of motive fluid comprising gasoline vapor and air from the storage chamber 71, preferably formed in the side 2 of the casing, into the chambers 62, 64 and 66. The amount of motive fluid delivered into such chambers may be regulated by any suitable means, such as a throttle 72 mounted in the inlet pipe 69 of the manifold and actuated by the lever 73. The chambers 63, 65 and 67, on the other hand, are supplied with air through the pipes 75 which connect with the air chamber 74. This air chamber is preferably formed in side 2 of the casing and, as shown in Figure 9, has its inner wall cut away adjacent the end plate 8, to provide an opening 75' interiorly of the casing for the entry of air. It is apparent that the air and motive fluid received by the respective chambers adjacent the valves 55 will, upon rotation of said valves, be alternately delivered by the valve wells 59 and 61 through inlet ports 28 into the adjacent compartment 23 of chamber 22. A spark plug 76 or other suitable igniting device is provided adjacent the outlet port 28' for igniting in timed relation the motive fluid so delivered by the valves 55.

A carburetor 77 is provided adjacent the casing for supplying the necessary motive fluid. This carburetor is connected to a suitable supply of gasoline or other volatile fluid by means of a pipe 78 and to a source of air, which I prefer shall be taken from within the casing, by means of the conduit 79. It should be noted that the air, before it reaches the carburetor, has first entered the casing through apertures 80 in the end plate 7 and has passed through the casing to the rear end thereof, where it enters air chamber 74 as well as conduit 79. Thus, the air effects a cooling of the rotary mechanism and, by the absorption of heat therefrom, facilitates the operation of the carburetor.

A pipe or tube 81 for the conveyance of motive fluid leads from the carburetor 77 to a passage 82 formed in side 3 of the casing adjacent inlet ports 27. A second passage 83 is also formed in side 3 adjacent outlet ports 29 and is adapted to receive the motive fluid from the adjacent compartment 23 of chamber 22, as compressed by the pistons. A pipe 84, connecting passage 83 and storage chamber 71, is provided for the passage of motive fluid therebetween.

An exhaust passage 85 is formed in side 2 of the casing adjacent outlet ports 30, for receiving, through such ports, the exhaust resulting from the explosion of motive fluid in chamber 22. Suitable means comprising an exhaust pipe 86 leading from the passage 85 serves to convey such exhaust from passage 85 to a point remote from said casing.

Means is provided for automatically regulating the pressure of motive fluid in storage chamber 71. This means is preferably a valve mechanism comprising a hollow shell or case 87 welded or otherwise fastened to the casing adjacent storage chamber 71. The adjoining walls of the shell and casing are provided with aligned apertures 88 forming a passage therebetween. The mouth of the aperture opening into the shell is countersunk to provide a seat for the valve head 89, the stem 90 of which is adapted to slide in the cap or sleeve 91. This cap is threaded in the shell 87 and has its lower end counterbored to receive a coiled spring 92, one end of which is adapted to bear against the bottom of the counterbore, and the other against the valve head 89. The valve head is thus held against its seat by the pressure of spring 92. It is obvious that the pressure of the spring can be increased or lessened to effect the release of motive fluid at different degrees of compression, by simply advancing or withdrawing the cap or sleeve 91 on its threads. Motive fluid entering the shell 87 upon the lifting of the valve head is returned by means of the pipe or conduit 93, to the passage 82.

Considering the operation of my invention, it will be observed (see Figure 10) that, upon starting of the rotor, the motive fluid supplied by the carburetor 77 is conducted by the pipe or tube 81 to the passage 82, from which it is drawn, through inlet ports 27, into the compartments 23 of chambers 22 (see Figure 3), and is there compressed and discharged through outlet ports 29 by the pistons 24, 25 and 26 in the manner heretofore described. From outlet ports 29 the motive fluid enters passage 83 and, being under compression, passes through the pipe 84 as shown in Figure 10 into the storage chamber 71, from which it is delivered, under control of the throttle 72, through the pipes 69 and 70 of manifold 68 into chambers 62, 64 and 66 in the housing 45. From these chambers the motive fluid enters the adjacent arcuate-shaped recesses 58 and, consequently, wells 59 of the valves 55. As these valves rotate with the shaft 53, which shaft is driven through the gears 42, 44 and 54, the wells 59 temporarily register with the inlet ports 28 and a charge of motive fluid is delivered therethrough into the adjacent compartments 23 of chamber 22 behind one of the pistons. Such charge is ignited by the spark plug 76 and the resultant explosion forces the piston forward until outlet port 30 is opened, thereby providing an outlet for the exhaust of the burnt gases and the clearance of the corresponding compartment 23 of the chamber 22 ahead of the next succeeding piston. The exhaust passing through these ports into passage 85 is conveyed, through the exhaust pipe 86, to a point remote from the casing.

As illustrated in Figure 9, internal cooling of the chambers 22 is carried on in the following manner: Air, after passing through the casing to the rear end thereof and not used by the carburetor, enters the air chamber 74 from which it is conducted by the pipes 75 to the chambers 63, 65 and 67 in the housing 45. From these chambers the air enters the arcuate recesses 60 and wells 61 of the valves 55. As the valves rotate, wells 61 register with outlet ports 28 and a charge of air is drawn into the adjacent compartment 23 of chamber 22 behind one of the pistons, by reason of the suction created by the advancement of such piston away from abutment 38. When this piston has advanced to open outlet port 30, the air is forced from compartment 23 of chamber 22 ahead of the next succeeding piston into passage 85, from which it is discharged like the exhaust gases through pipe 86.

The timing of the rotation of valves 55 (see Figures 3 and 11) with reference to the rotation of the rotor is such that the wells 59 register with inlet ports 28 immediately following the passage of alternating pistons past said inlet ports 28, while wells 61 register with such inlet ports immediately following the passage of the intermediate pistons past such ports. It is, therefore, apparent that motive fluid enters alternate compartments 23 in chamber 22 and the air the intermediate compartments, thus a power phase will be followed by an air phase and internal cooling of the rotor parts will be effected.

I claim:

In a device of the class described comprising a casing provided with a chamber, and a bore provided with opposed arcuate portions and a circumferential groove therein, a rotor in peripheral contact with the arcuate portions of said bore, and adapted in conjunction with said groove to provide an annular chamber in said casing, a pair of rotary abutments mounted in said casing and projecting into said annular chamber to divide said chamber into two sections, a plurality of pistons disposed on said rotor and projecting into and movable through each annular chamber section, a conduit opening into one of said annular chamber sections and communicating with said casing chamber whereby fluid contained in said chamber section is, by the movement of the pistons therethrough, compressed and forced into said casing chamber, an annular housing disposed on said casing and having a bore therein disposed in axial parallelism with said casing bore, said housing bore having spaced peripheral grooves therein, a conduit connecting said housing bore and said casing bore, a valve rotatably mounted in said annular housing having flanges at each end thereof engaging the peripheral grooves of said housing bore to provide a separate chamber at each side of said valve and a pair of separate, arcuately shaped, concentrically disposed recesses therein, each of said recesses having a well lying at substantially diametrically opposed portions of the periphery of the valve and extending axially of said valve entirely across the periphery thereof, a conduit connecting said casing chamber with the bore of said annular housing through which the compressed fluid in said casing chamber may flow into the valve chambers, and gearing connecting said valve, said rotary abutments and said rotor for synchronous rotation together whereby said valve wells are successively moved into registry with said second-mentioned conduit to discharge the compressed fluid contained in said chambers into said other section of said annular chamber of the casing.

RUFUS CLYDE SWINK.